May 29, 1951     J. B. ROTUREAU     2,555,097
SELF-STARTING SINGLE PHASE MOTOR
Filed Oct. 20, 1949     2 Sheets-Sheet 1
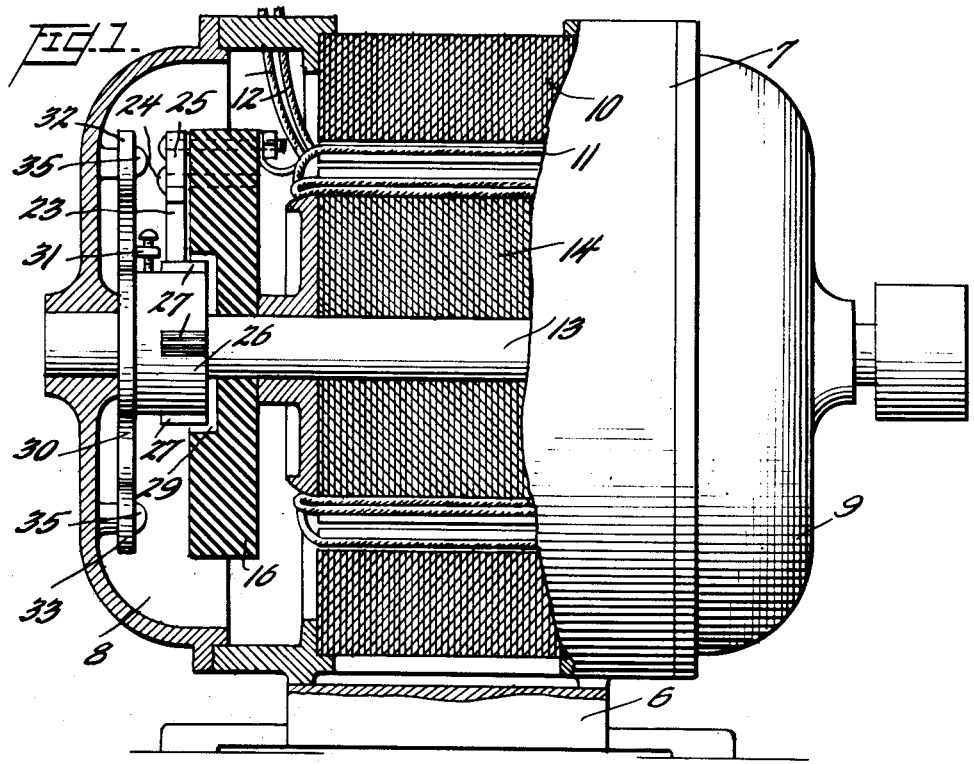
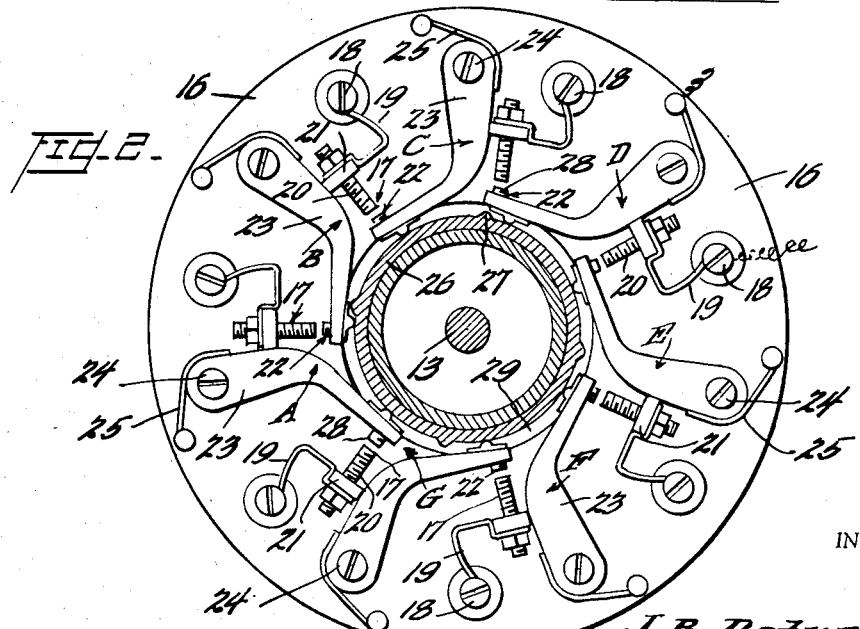
INVENTOR
J. B. Rotureau,
BY Henry H. Snelling
ATTORNEY May 29, 1951 J. B. ROTUREAU 2,555,097
SELF-STARTING SINGLE PHASE MOTOR
Filed Oct. 20, 1949 2 Sheets-Sheet 2

INVENTOR
J. B. Rotureau,
BY Henry H. Snelling
ATTORNEY

Patented May 29, 1951

2,555,097

UNITED STATES PATENT OFFICE 2,555,097

SELF-STARTING SINGLE-PHASE MOTOR

Jacob B. Rotureau, Columbia, S. C.

Application October 20, 1949, Serial No. 122,451

7 Claims. (Cl. 318—196)

This invention relates to alternating current motors, and particularly to single phase motors adapted to start as repulsion motors and to run as induction motors.

It is well known that single phase induction motors have no starting torque unless provided with some special type of starting device. In small motors a phase-splitting device is employed but in larger motors it is usual to start the motor as a repulsion motor, and then to provide means for converting it into an induction motor when it is running at sufficient speed. With the latter type of arrangement it is necessary to provide a commutator which is used only during starting and remains short-circuited at all times when the motor is running as an induction motor. The commutator is an expensive element to produce and the means for short-circuiting it is complicated and expensive and unless well designed may be subject to troublesome failures.

The present invention is concerned with an improved motor capable of starting on the repulsion principle and running on the induction principle without the use of a commutator. The result is achieved by substituting for the commutator and its short-circuiting means, a unitary switching arrangement capable of replacing both the commutator and the short-circuiting device, and performing all of the functions of both.

The main object of the invention is, therefore, to provide a self-starting induction which requires neither a phase-splitting device nor a commutator.

Another object is to provide a switching unit which can be installed in place of a commutator on an alternating current commutator motor of standard type.

Still another object of the invention is to provide a motor of the above type which is reversible.

Numerous other objects and advantages of the invention will be apparent from the following specification when it is read in conjunction with the drawings in which:

Figure 1 is a longitudinal partial section through a motor embodying my invention;

Figure 2 is a detail face view of a switching unit embodying the invention;

Figure 3:
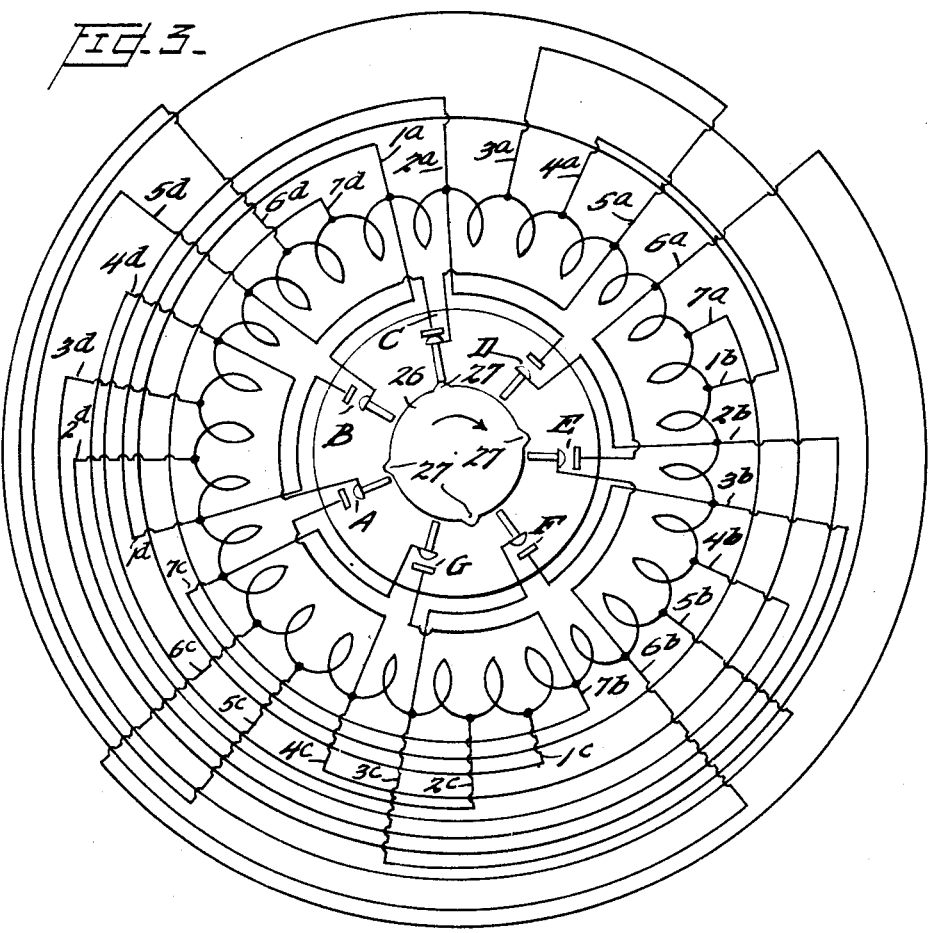
Figure 3 is a diagrammatic view of the rotor circuits of the switching unit, illustrating the action of the circuit closers which form a part of the unit.

The invention will be readily understood by reference to the drawings, and more particularly to Fig. 1 which shows in partial section a conventional form of motor capable of starting on the repulsion principle and running on the induction principle. In this motor the standard commutator with its short-circuiting mechanism has been replaced by a switching unit of the present invention. As shown the motor comprises a base 6 supporting a stator frame 7 having enclosing end bells 8 and 9.

The stator frame carries the usual laminated structure 10 having polar projections about which the stator windings 11 are wound and to which current may be fed through leads 12. Since the stator construction is common and well known it is believed that detailed explanation is unnecessary. It should, therefore, be sufficient to state that the winding is distributed over the stator to form a plurality of distinct poles and is connected across the line so as to transfer electric energy to the rotor by induction.

A shaft 13 journaled in the end bells carries a laminated rotor 14 having peripheral slots to accommodate winding sections as indicated in Fig. 3, and connected to circuit closers carried by an insulating ring 16 secured to the rotor. An odd number of these circuit closers is used, and by way of illustration seven are indicated.

In Fig. 2 the ring 16 is shown with the circuit closers A, B, C, etc., which it carries. The circuit closers each consist of two parts, that is, a resiliently mounted adjustable contact 17 and a movable contact 22. The contact 17 is connected to contact stud 18 by a stiff cushioning spring 19. The contact area of 17 is at the inner end of a rod 20 threaded through the support 21 on spring 19 to provide for adjustment. The spring 19 cushions the impact when the circuit is closed.

A movable contact 22 is carried by a relatively heavy arm 23 pivoted on stud 24 and cooperates with the contact 17 to control the circuit of a rotor winding section. The arm 23 has an adjustable striking surface 28. The circuit closers A, B, C, etc. are each biased to open position by light springs 25 disposed around studs 24, but may be closed by centrifugal action when the rotor reaches a speed satisfactory for induction operation. When that speed is exceeded the heavy arms 23 are swung outwardly about their studs 24 to overcome the bias of springs 25 and all of the circuit closers A, B, C, etc. are closed to short circuit all of the rotor winding sections and converting it into a typical short-circuited secondary winding for induction operation.

Disposed around the shaft 13 and adjustably secured to end bell 8 is a cam ring 26 carrying an even number, in the present instance four, protuberances 27 adapted to mechanically close the circuit closers A, B, etc. one at a time as a protuberance engages the striking surface of one of the contact arms. As shown in Fig. 1 the cam ring 26 is set back into a recess 29 of the ring 16 but this is not essential.

Reference to the diagram of Fig. 3 will indicate how the circuit closers control the sections of the rotor winding. In that figure it will be seen that circuit closer C is closed to short circuit the winding sections 5d, 5c, 5a. As circuit closer C opens, E closes (assuming clockwise rotation of the rotor), to short circuit another section. Thus it will be seen that only one of the circuit closers can be closed at a time by cam action. When, however, the speed of the rotor exceeds the critical value to overcome the bias of springs 25 all of the circuit closers are closed, the striking surfaces 28 are all moved out of the area defined by the protuberances 27 and the cams become ineffective. Thus the rotor runs as a short-circuited secondary until its speed drops sufficiently to open one or more of the circuit closers to initiate repulsion operation.

The above invention not only provides a simple reliable construction but one which permits ready reversal of the direction of rotation. Apparatus for causing this is shown in Fig. 4.

Figure 4:
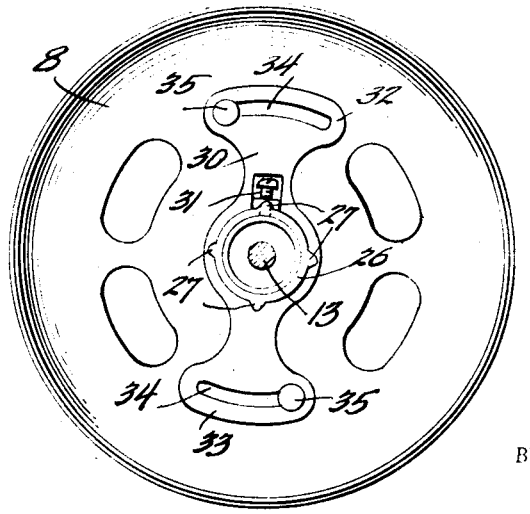
Figure 4 is an inside face view of the end bell of the machine of Fig. 1 showing the reversing adjustment for the switching unit.

In Fig. 4 the inside of end bell 8 is shown with the cam ring 26 mounted thereon, and carried by a member 30 secured thereto as at 31. Each of the two enlarged ends 32 and 33 of the member contains an arcuate slot 34 cooperating with a locking stud 35. As shown the studs engage the ends of their respective slots for forward rotation of the rotor. By loosening the studs 35 and shifting the member 30 to its extreme alter-position when the studs engage the opposite ends of slots 34, reverse rotation is provided for. If desired the member 30 can be made operable from the outside of the machine to facilitate the reversing operation, especially where frequent reversals are required.

It will be clear from the above that I have provided a construction in which a unitary device can replace both the commutator and the brush and commutator short-circuiting mechanism in a repulsion induction motor. Not only is the device effective but it provides for facile reversal of the motor by a simple adjustment.

It is to be understood that while I have disclosed only one specific form of apparatus, modifications may be made in the details, within the scope of the appended claims without departing from the spirit and scope of the invention.

Having thus described the invention, I claim:

1. A single phase alternating current motor of the self-starting type comprising, a stator having a primary winding thereon, a rotor having a closed circuit winding thereon, a shaft for supporting said rotor, a plurality of circumferentially spaced circuit controlling devices connected at evenly spaced intervals to said rotor winding and rotatable with it, spring means for biasing said circuit controlling devices toward open-circuit position, but rendered ineffective by the rotation of said rotor at a predetermined speed, and stationary cam means spaced around said shaft and arranged to actuate said circuit-controlling devices successively as said rotor rotates below said predetermined speed.

2. A single phase alternating current motor of the repulsion-start-induction-run type, comprising a stator and a rotor each having conventional windings thereon, an insulating ring carried by one end of said rotor, a plurality of circuit closers spaced around said ring and each adapted, when closed, to short circuit a portion of the rotor winding, spring means associated with each circuit closer for biasing it to open position but capable of being overcome by centrifugal force when said rotor reaches a critical speed, and stationary cam means disposed in operative relation to said circuit closers for closing them successively to short circuit individual sections of the rotor winding when the motor is being started.

3. The combination set forth in claim 2 wherein said cam is adjustable to reverse the motor.

4. A self-starting single phase alternating current motor of the induction type comprising a stator having a winding, a rotor having windings capable of being short-circuited in sections, a plurality of circuit closers carried by the rotor, said circuit-closers being connected to successive sections of the rotor winding and evenly spaced around it, a stationary cam disposed to maintain one of said circuit closers closed at all times when said rotor is stationary or running below its critical speed, and centrifugally responsive means carried by said circuit closers for closing all of the same and rendering said cam ineffective when the speed of said rotor exceeds a predetermined critical value.

5. A self-starting single phase alternating current motor comprising a stator frame having windings thereon, a rotor having induction windings thereon, an insulating ring on one end of said rotor, a plurality of circuit-closers carried on said ring and connected to different sections of the rotor winding, and a stationary cam carried by the stator frame and having a series of protuberances arranged to actuate said circuit closers one at a time in succession as the rotor rotates below a predetermined speed.

6. A self-starting single phase alternating current motor comprising a stator having windings thereon, a rotor of the induction type, an odd number of circuit closers carried by said rotor and each adapted to control a section of the rotor winding, spring means for biasing said circuit closers to open position when the rotor is operating below a predetermined critical speed, a stationary cam carried by the stator and having an even number of protuberances thereon, said cam being so disposed as to close said circuit closers singly in succession when said rotor is operating below its critical speed, and centrifugally responsive means effective to close all of said circuit closers and to short circuit all of the sections of the rotor winding when the rotor speed exceeds its critical value.

7. A self-starting single phase alternating current motor comprising a stator having windings thereon, a rotor of the induction type, an odd number of circuit closers carried by said rotor and each adapted to control a section of the rotor winding, spring means for biasing said circuit closers to open position when the rotor is operating below a predetermined critical speed, a stationary cam carried by the stator and having an even number of protuberances thereon, said cam being so disposed as to close said circuit closers singly in succession when said rotor is operating below its critical speed, centrifugally responsive means effective to close all of said circuit closers and to short circuit all of the sections of the rotor winding when the rotor speed exceeds its critical value, and adjusting means connected to said cam to permit movement of said cam to cause a reversal in the direction of rotation of said rotor.

JACOB B. ROTUREAU.

REFERENCES CITED

The following references are of record in the file of this patent:

UNITED STATES PATENTS

| Number | Name | Date |
|---|---|---|
| 1,014,001 | Hitner | Jan. 9, 1912 |
| 1,813,764 | Prince | July 7, 1931 |
| 2,388,889 | Whelan | Nov. 13, 1945 |